United States Patent
Dadabhoy et al.

(10) Patent No.: US 8,758,612 B2
(45) Date of Patent: Jun. 24, 2014

(54) PROCESS AND DEVICE FOR SEPARATING LIQUID FROM A MULTIPHASE MIXTURE

(75) Inventors: Jal Rustom Dadabhoy, Overijse (BE); Massimo Fedeli, Wemmel (BE); Patrick Markus Dhaese, Curitiba (BR); Yvan Frans Van Hoof, Kapellen (BE)

(73) Assignee: Solvay SA, Brussels (BE)

( * ) Notice: Subject to any disclaimer, the term of this patent is extended or adjusted under 35 U.S.C. 154(b) by 261 days.

(21) Appl. No.: 13/375,691

(22) PCT Filed: Jun. 2, 2010

(86) PCT No.: PCT/EP2010/057716
§ 371 (c)(1),
(2), (4) Date: Dec. 1, 2011

(87) PCT Pub. No.: WO2010/139728
PCT Pub. Date: Dec. 9, 2010

(65) Prior Publication Data
US 2012/0070356 A1    Mar. 22, 2012

(30) Foreign Application Priority Data

Jun. 5, 2009    (EP) .................................... 09162095

(51) Int. Cl.
*B01D 24/00*    (2006.01)
(52) U.S. Cl.
USPC ........ 210/338; 210/416.1; 210/171; 423/588; 422/217
(58) Field of Classification Search
USPC ....................................................... 423/588
See application file for complete search history.

(56) References Cited

U.S. PATENT DOCUMENTS

| | | |
|---|---|---|
| 4,605,678 A | 8/1986 | Brennan et al. |
| 5,324,335 A | 6/1994 | Benham et al. |
| 5,527,473 A | 6/1996 | Ackerman |
| 5,900,159 A | 5/1999 | Engel et al. |
| 6,146,537 A | 11/2000 | Ferschneider et al. |
| 6,887,390 B2 | 5/2005 | Mohedas et al. |
| 7,375,431 B1 | 5/2008 | Patwardhan et al. |
| 7,378,452 B2 | 5/2008 | Long et al. |
| 2005/0047992 A1 | 3/2005 | Dietrich et al. |

(Continued)

FOREIGN PATENT DOCUMENTS

| DE | 3245318 A1 | 6/1984 |
|---|---|---|
| EP | 450859 A1 | 10/1991 |

(Continued)

OTHER PUBLICATIONS

Kirk-Othmer Encyclopedia of Chemical Technology, 2003, vol. 11, Chapter—"Filtration", pp. 321-397, (DOI 10.1002/0471238961. 0609122019220118.a01.pub2), John Wiley & Sons, Inc.; 77 pgs.

(Continued)

*Primary Examiner* — Melissa Stalder
(74) *Attorney, Agent, or Firm* — Beatrice C. Ortego

(57) ABSTRACT

Process and device for separating liquid from a multiphase mixture contained in a vessel and comprising solid particles and at least one liquid phase forming together at least one suspension, and a gas phase in which at least part of the mixture is circulated through at least one cross-flow filter located outside the vessel, therefore separating said part of the mixture into a filtered liquid and a concentrate.

16 Claims, 6 Drawing Sheets

(56) References Cited

U.S. PATENT DOCUMENTS

| | | |
|---|---|---|
| 2006/0198771 A1 | 9/2006 | Devic |
| 2007/0215521 A1 | 9/2007 | Havlik et al. |
| 2009/0062108 A1 | 3/2009 | Demirel et al. |
| 2009/0197979 A1* | 8/2009 | Zhang et al. ............. 518/705 |
| 2011/0165029 A1 | 7/2011 | Zhang et al. |

FOREIGN PATENT DOCUMENTS

| | | |
|---|---|---|
| EP | 592176 A1 | 4/1994 |
| EP | 0609079 A1 | 8/1994 |
| GB | 2281224 A | 3/1995 |
| WO | WO 9416807 A1 | 8/1994 |
| WO | WO 2007140710 A1 | 12/2007 |

OTHER PUBLICATIONS

Ullmann's Encyclopedia of Industrial Chemistry, Fifth Edition, 1985, vol. A2, Amines, Aliphatic to Antibiotics, Executive Editor: Wolfgang Gerhartz, Chapter—"Anthraquinone", pp. 347-354; 10 pgs.

* cited by examiner

PROCESS AND DEVICE FOR SEPARATING LIQUID FROM A MULTIPHASE MIXTURE

CROSS-REFERENCE TO RELATED APPLICATIONS

The present application is a U.S. national stage entry under 35 U.S.C. §371 of International Application No. PCT/EP2010/057716 filed Jun. 2, 2010, which claims the benefit of the European application no. 09162095.5 filed on Jun. 5, 2009, the whole content of this application being herein incorporated by reference for all purposes.

TECHNICAL FIELD OF THE INVENTION

The present invention relates to a process and a device for separating liquid from a multiphase mixture contained in a vessel and comprising solid particles and at least one liquid phase forming together at least one suspension, and a gas phase flowing upwards through the suspension. The present invention also relates to a process for the manufacture of hydrogen peroxide comprising said separating process or using said device.

BACKGROUND

Three-phase slurry reactors, comprising a mixture of solid particles and at least one liquid phase forming together at least one suspension, and a gas phase flowing upwards through the suspension, are well known to those skilled in the art. In these reactors, solid catalyst particles are dispersed or held in suspension in the liquid phase by a gas phase bubbling through the liquid phase. In operation, said reactors typically comprise a slurry zone and a freeboard zone, the slurry zone comprising the solid particles in suspension in the liquid, gaseous reactants bubbling through the slurry, and the freeboard zone, located above the slurry, comprising primarily the gaseous products and/or reactants.

Examples of chemical processes which are carried out in a three phase slurry reactor are those which make use of solid catalyst particles and of at least one gaseous reactant and produce a product which is liquid under reaction conditions. Examples of such processes include hydrogenation processes, hydroformylation, alkanol synthesis, the preparation of aromatic urethanes using carbon monoxide, Kölbel-Engelhardt synthesis, polyolefin synthesis, and Fischer-Tropsch synthesis.

Many ways have been proposed to separate at least part of the liquid from the multiphase mixture.

For example, in EP 0609079, a filtration zone is located in the slurry bed, close to its upper surface. The liquid product is separated from the solid particles by passing through a filtration medium in a first direction, so that a cake of the solid particles forms on the filtration medium. However, such a dead-end filtration implies regular backflushing of the filtering medium in a second direction, opposite to the first one, to dislodge the cake from the filtering medium. The liquid used for backflushing constitutes an additional load which will also have to be filtered. The productivity of the global process will thus be lowered due to backflushing.

In WO 94/16807, the filtration zone surrounds the reactor vessel and the filter element may be provided by a portion of the wall of the reactor vessel itself, which is composed of a filter material. With such a design, there is no build-up of solid material on the filter element, due to the turbulent motion of the slurry. Yet, such a filtering system is elaborate and is thus expensive and difficult to implement. Furthermore, such an internal filtering system implies the shut down of the vessel for maintenance, for example if the filter medium needs chemical cleaning.

U.S. Pat. No. 5,900,159 discloses the degasification of the multiphase mixture using a hydrocyclone or a specific continuous disengagement method separation and the subsequent separation of the resulting slurry into the liquid and a concentrated slurry via a cross-flow filter located outside the vessel, said slurry being brought to the cross-flow filter through the medium of a pump. The main advantage of the cross-flow filtration system is to avoid the build-up of solid material on the filter medium.

Cross-flow filtration is a well known filtration method, wherein the residue (retentate) is continuously removed from the filter medium by shear of the slurry which flows along the filter, in tangential flow to the filter medium. The shear can be produced by rotating elements such as rotating filters or rotors, but the shear is usually produced by the relative velocity of the slurry to the filtration medium. A general overview of cross-filtration can be found in Kirk-Othmer Encyclopedia of Chemical Technology (2003), Chapter "Filtration", pages 383-388 (DOI 10.1002/0471238961.0609122019220118.a01.pub2), which is incorporated herein by reference.

The method of U.S. Pat. No. 5,900,159 requires the use of a pump between the degasification mean and the cross-flow filter. A first drawback associated to the use of said pump is to lead to at least some attrition of the solid particles or, if the particles are not sensitive at all to attrition, to erosion of the pump. A second drawback is that the pump is sensitive to gas and tends to function less properly in the presence of gas, which implies a perfect degasification of the slurry upstream of the pump. A third drawback is that pumps consume energy.

SUMMARY

The purpose of the present invention is to provide a new process which does not present the above disadvantages. Especially, the purpose of the present invention is to provide a process and a device allowing the separation of liquid from a multiphase mixture comprising solid particles and at least one liquid phase forming together at least one suspension, and a gas phase flowing upwards through the suspension.

The present invention therefore relates to a process for separating liquid from a multiphase mixture contained in a vessel and comprising solid particles and at least one liquid phase forming together at least one suspension, and a gas phase flowing upwards through the suspension such that a gas-lift effect occurs inside the vessel, in which at least part of the mixture, optionally at least partially degassed, is circulated through at least one cross-flow filter located outside the vessel, therefore separating said part of the mixture into a liquid and a concentrate, namely the remainder part of the multiphase mixture impoverished in liquid, wherein said part of the mixture circulates through the cross-flow filter using the natural recirculation provided by the gas-lift effect occurring inside the vessel.

Indeed, it has been surprisingly found, in the framework of the present invention, that the natural recirculation provided by the gas-lift effect occurring inside the vessel can be used to make at least part of the mixture circulate outside the vessel, through the cross-flow filter. A gas-lift effect occurs in slurry reactors, further to the gas holdup difference between the riser current and the down-corner current. This difference provides a density difference between these two zones and a natural recirculation of the slurry inside the vessel. According to the present process, the recirculation provided by the-gas lift effect is used as a tangential flow in the cross-flow filtration system. The circulation of at least part of the down-corner flow through the cross-flow filtration system, via pipes and connections, is a function of the density difference between the riser current and the down-corner current, the height of the multiphase mixture, and the resistance of the filtration system.

A pump forcing the circulation of the multiphase mixture through the cross-flow filter is therefore not necessary, which is advantageous. Indeed, this avoids attrition of the solid particles and/or erosion of the pump. It also suppresses the need for a degassing step upstream the pump. Last but not least, it saves some costs and energy.

BRIEF DESCRIPTION OF THE DRAWINGS

For a detailed description, reference will now be made to the accompanying drawings in which.

DETAILED DESCRIPTION

Figure 1:
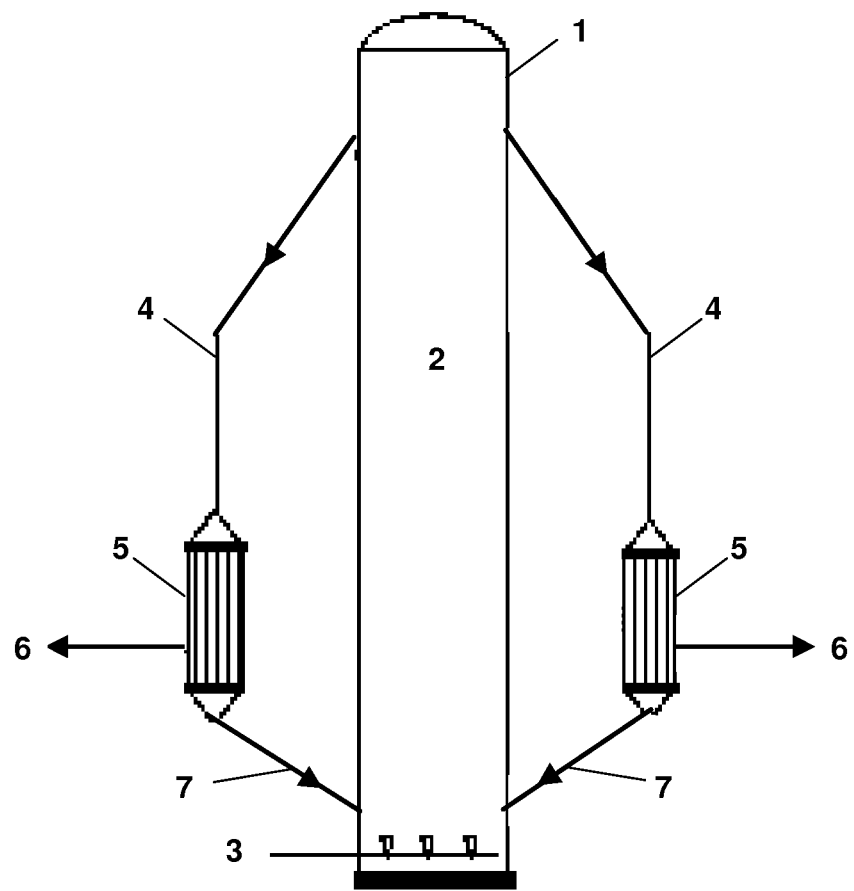
FIG. 1 illustrates an embodiment of the process and device of the present invention, based on the use of two cross-flow filters arranged in parallel.

According to an especially preferred embodiment, the part of the mixture which circulates through the cross-flow filter circulates using only the natural recirculation provided by the gas-lift effect occurring inside the vessel. Especially, the mixture is circulated through the cross-flow filter without the use of a pump upstream the cross-flow filter.

In the present process, the circulation flow of the multiphase mixture out of the vessel and through the at least one cross-flow filter (tangential flow) results from the equilibrium between the total pressure drop generated by such flow rate through the external circuit, which includes at least one cross-flow filter and the cross-flow filter feeding pipes and discharge pipes, and the total driving force available in the system, and especially from the total driving force available for a given vessel and process conditions.

The total driving force available is defined by the gas holdup of the liquid phase contained in the vessel and the height of the multiphase mixture in the vessel. The gas holdup corresponds to the volume increase between the liquid phase without any addition of gas and the volume of the expanded liquid-gas mixture when a gas phase is passed through the liquid phase. In the present process, the gas holdup in the vessel (i.e., the gas holdup of the liquid phase comprised in the vessel) is usually of at least 5%, preferably at least 10%, for example at least 15%. The gas holdup in the vessel can be as high as possible but is generally of at most 70%, in particular at most 50%, and very particularly at most 30%. The gas holdup, and thus the total driving force available, depends mainly on the operating conditions such as the gas velocity at the bottom and at the top of the vessel, the gas density, the pressure inside the vessel, and the physical properties of the liquid such as its surface tension, viscosity and density, and on the geometry of the vessel, in particular its height and its diameter. For a given vessel, the real driving force available depends on the ratio of the gas holdup in the multiphase mixture comprised inside the vessel compared to the gas holdup in the multiphase mixture feeding the cross-flow filter. Higher driving force available means higher tangential flow through the cross-flow filter for the same system installed.

Thus, for a given total driving force available, the circulation flow depends on the geometry of the external circuit, comprising at least one cross-flow filter and the cross-flow filter feeding and discharge pipes, which determines the pressure drops related to this circuit.

In the process of the invention, the solid particles in the multiphase mixture are typically at least in part catalyst particles, the liquid phase present in the multiphase mixture is generally at least in part a reaction product, and the gas phase is usually at least in part a synthesis gas, for example hydrogen, oxygen, carbon monoxide etc.

In the process of the invention, the solid particles present in the multiphase mixture are kept in suspension in the vessel by means of the gas and/or the liquid superficial velocity. In the present process, the gas phase most often has a velocity equal to or higher than 0.1 m/s at the bottom of the reactor, advantageously from 0.1 to 1 m/s, for instance from 0.1 to 0.5 m/s. The gas velocity at the top of the reactor is usually lower, for example from 0.02 to 0.1 m/s. The maximum possible average particle size of the solid particles may inter alia depend on the gas and liquid velocity, and the density difference between the solid particles and the liquid. Typically, the average particle size is not greater than 1 mm, preferably not greater than 600 μm. To allow efficient filtration, typically the average particle size is not smaller than 1 μm, preferably not smaller than 5 μm, more preferably not smaller than 10 μm. The preferred average particle size is usually from 10 to 600 μm, preferably from 60 to 250 μm. Due to attrition, the average solid particle size may decrease with time during operation of the particles. If desired, a mixture of catalyst particles and other solid particles may be used, for example a mixture with inert material such as porous or non-porous solids such as glass beads, inorganic oxides of Groups IIIB, IVB, VB, the lanthanides and actinides, diatomaceous earths, kieselguhr or zeolites, or a mixture with other catalytically active solid particles having a different density, activity, productivity or selectivity. The other solid particles may have an average particle size which is different from the average particle size of the catalyst particles.

The cross-flow filter used in the present invention is located outside the vessel. Said cross-flow filter typically comprises one or more tubes, wherein at least part of the wall of each tube is made of a filter medium, preferably almost the whole length of the tubes is made of a filter medium. In a first embodiment, the multiphase mixture flows through the cross-flow filter outside the tubes and the filtered liquid flows inside the tubes and is collected inside the tubes (outside-in). In a second embodiment, the multiphase mixture flows through the cross-flow filter inside the tubes and the filtered liquid is collected outside the tubes (inside-out). If the at least one tube operates according to the first embodiment (outside-in), it may be located horizontally or vertically, preferably horizontally. If the at least one tube operates according to the second embodiment (inside-out), it must be located vertically and the down-corner flow from the vessel flows downwards.

In the process of the present invention, the multiphase mixture is circulated through at least one cross-flow filter. More than one cross-flow filter may also be present, arranged in parallel. Preferably, the multiphase mixture is circulated through more than one cross-flow filter arranged in parallel, especially in at least 3 cross-flow filters, preferably in at least 5 cross-flow filters.

According to the present invention, the number of tubes is usually of at least 1, preferably at least 5, especially at least 10. The number of tubes is not limited and can be as high as 300. Depending on the vessel, the number of tubes may be as high as 250, especially as high as 200, for example between 100 and 200.

The diameter of each tube present in the cross-flow filter typically ranges from 1 to 10 cm, preferably from 1.5 to 5 cm, for example around 2 to 3 cm. The length of each tube depends upon the desired pressure drop between the cross-flow filter inlet and the cross-flow filter outlet and upon the desired concentration of solid in the concentrate at the outlet of the cross-flow filter. The length of each tube may be from 1 to 10 m, especially from 1 to 5 m, for example around 2 or 3 m.

The filter medium of the tubes present in the cross-flow filter may be made of any known filter material such as ceramics, porous metal such as sintered stainless steel, or others. For example, the filter medium can be selected from Rigismesh K® (from Pall), Poral® (from Federal Mogul), GKN Sinter Metals or HyPulse® LSX from Mott Metallurgical Corporation.

According to the present invention, the filter medium pore openings have a size such that they do not allow significant passage of particles, even after some attrition of said particles. Thus, depending on the average size of the particles and their particle size distribution, the pore openings of the filter medium should have a diameter in the range from 0.1 to 100 µm, preferably from 0.5 to 50 µm, more preferably from 1 to 30 µm.

In the present invention, the driving force in the filtration is usually a differential pressure across the filter medium. The pressure drop across the filter medium is usually of at least 0.05 bar, particularly at least 0.1 bar. The pressure drop is most often of at most 10 bar, in particular less than 10 bar, especially of at most 5 bar. Typically, the pressure drop across the filter medium is in the range from 0.05 to 10 bar, preferably from 0.05 to less than 10 bar, more preferably from 0.1 to 5 bar. Depending on the filter medium and the pressure inside the vessel, the pressure drop may be from 1 to 5 bar or may be as low as at most 1 bar, in particular less than 1 bar, for instance from 0.1 to 0.2 bar. Without being bound by any theory, a too high pressure drop across the filter medium, in particular a pressure drop above 10 bar can lead to fouling and especially in-depth fouling of the filter medium. Indeed, with a high pressure drop, small particles will be driven inside the filter medium and will not be removed by the tangential flow of the medium to be filtered along the filter medium.

Advantageously the pressure drop of the multiphase mixture between the inlet and the outlet of the cross-flow filter (i.e. pressure drop of the stream flowing through the cross-flow filter) is less than the pressure drop across the filter medium. The pressure drops between the inlet and outlet of the cross-flow filter are typically at least 50%, preferably at least 60% of the total pressure drops of the entire external circuit which includes the cross-flow filter. Indeed, the filtration efficiency is linked to the tangential velocity of the multiphase mixture along the cross-flow filter. It is thus very desirable to achieve tangential velocities as high as possible, which can be achieved if the pressure drop along the external circuit (at least one cross-flow filter and its feeding and discharge pipes) is concentrated between the inlet and the outlet of the cross-flow filter. This can be achieved for example by increasing the cross-flow filter feeding and discharge pipes diameters, by decreasing the filter-tubes diameter and/or by increasing the filter-tubes length.

The tangential velocity of the multiphase mixture, continuously impoverished in liquid, along the cross-flow filter filtration medium, is a function of the total driving force available and of the geometry of the external circuit which includes the at least one cross-flow filter and the feeding and discharge pipes. In the process of the present invention, said tangential velocity is typically in the range from 0.5 to 6 m/s, in particular from 1 to 5 m/s, for instance from 2 to 3 m/s. Lower and higher tangential velocities are possible but at a tangential velocity greater than 6 m/s, the pressure drop across the filter medium should be rather high to generate a reasonable flux of liquid through the filter medium. At a tangential velocity smaller than 0.5 m/s, the pressure drop across the filter medium should be rather small to enable removal of filter cake by means of shear. This low pressure drop in turn results in a low flux of liquid through the filter medium.

According to the process of the invention, the trans-medium velocity of the filtered liquid through the filter medium is preferably kept to a value equal to or below 15 m/h, preferably equal to or below 10 m/h, for instance equal to or below 8 m/h. If the trans-medium velocity of the filtered liquid is kept below said thresholds, the filtration flow can be sustained and maintained without any need for chemical cleaning of the filtration medium. Thus, the trans-medium velocity has an impact upon the flux maintenance. The trans-medium velocity also has an impact upon the minimal required pressure difference across the filter medium to allow the filtration to occur. However this is not a limiting factor in most of the cases. The trans-medium velocity of the filtered liquid through the filter medium is usually equal to or higher than 0.5 m/h, in particular equal to or higher than 1 m/h, especially equal to or higher than 5 m/h. Values of trans-medium velocity of the filtered liquid below said values will usually lead to a non-efficient process because the required filtration surface might increase unnecessarily for the same duty. Thus, the filtration system of this invention would become economically unviable and might loose its advantages versus other standard filtration systems. The trans-medium velocity of the filtered liquid through the filter medium may typically be from 1 to 15 m/h, preferably from 5 to 10 m/h.

In a preferred embodiment of the process of the present invention, the tangential velocity of multiphase mixture, continuously impoverished in filtered liquid, along the filter medium is of from 400 to 2000 times, preferably from 700 to 1500 times, for example around 1000 times the trans-medium velocity of the filtered liquid through the filter medium.

For a given trans-medium filtration velocity of the filtered liquid through the filter medium of the cross-flow filter tubes, both the concentration of the solid particles in the concentrate at the outlet of the cross-flow filter and the pressure drop between the inlet and the outlet of the cross-flow filter increase by increasing the length of the tubes. The limit to the length of the tubes is given by the maximum allowable pressure drop, which is the driving force of the system, and by the maximum allowable concentration of the solid particles in the concentrate leaving the cross-flow filter.

According to the present invention, for a given total filtration area in a cross-flow filter unit, the diameter and the number of tubes can vary. To achieve the total filtration medium area in a cross-flow filter unit, it is especially advantageous to increase the number of tubes and to decrease their diameter rather than to increase the diameter of the tubes and to decrease their number. Without being bound by any theory, it is believed that the total required flow rate of multiphase mixture along the cross-flow filter unit which can generate the required tangential velocity in each tube decreases when the number of tubes increases and their diameter decreases. Since the total available pressure drops of the system, which is the driving force for the circulation of the multiphase mixture through the cross-flow filter, is fixed by the geometry and process conditions of the reactor, it is preferable to keep the total flow along the filter unit as low as possible to reduce the pressure drop consumed external to the filter. For a given total filtration medium area in a cross-flow filter unit, it is also preferable to increase the length of the tubes and to reduce their number. Indeed, this will reduce the total flow of multiphase mixture along the cross filter unit and then minimize the pressure drop consumed external to the filter. This will also allow reducing the diameter of the filter unit vessel and then the required investment to build it.

In a particular embodiment of the present invention, the cross-flow filter can be a dynamic cross-flow filter, i.e. a cross-flow filter with rotating elements. Such dynamic cross-flow filters are described, for example, in Kirk-Othmer Encyclopedia of Chemical Technology (2003), Chapter "Filtration", pages 383-387 (DOI 10.1002/0471238961.0609122019220118.a01.pub2), which is incorporated herein by reference. In such dynamic cross-flow filters, the tangential flow of the suspension over the filter medium is generated at least partially by rotating elements which are located close to the filter medium, thus generating high fluid shear. The high velocity gradient of this high shear cross flow prevents that solids form a deposit on the filter medium. Simultaneously, the suspension is thoroughly mixed by the rotating elements which prevent layers of high solids concentration near the filter medium. For example, rotating disks or rotating cylindrical element(s) can be used. A dynamic cross-flow filter has the advantage that a larger yield can be achieved compared to a conventional cross-flow filter, as the filtrate flow rates can be 2 to 10 times higher. Such a dynamic cross-flow filter also has the advantage to allow classification of the particles, for example by removing fines that can be present in the multiphase mixture, especially particles having a size below a certain threshold, thus further decreasing the filter fouling and the necessity for backflush cleaning of the filter medium. In such a case, the filtrate will comprise the filtered liquid and the fines (or the particles having a size bellow the defined threshold), which will require a further purification step to recover the filtered liquid. An example of dynamic cross-flow filter is the Dyno Filter® from Bokela, which is build up of disc shaped filter modules (stators) which are arranged in series and of rotor discs intercalated between the stators, the stator discs being equipped with drainage channels for the filtrate.

In the various embodiments of the present invention, the separation in the cross-flow filter is usually carried out at substantially the same temperature as the multiphase mixture in the reactor vessel. This separation is in general carried out at substantially the same pressure as applied in the reactor vessel.

Cross-flow filtration according to the present invention is applicable to many solid-liquid separation problems. It has the advantage to minimize filter fouling (filter cake build-up). Backflush cleaning of the filter medium are thus significantly reduced, or even suppressed.

In the present invention, at the outlet of the cross-flow filter, the multiphase mixture is separated into a filtered liquid and a concentrate. By "concentrate" is meant the remainder part of the multiphase mixture, i.e. the multiphase mixture impoverished in liquid or enriched in solid particles and optionally in gas. The concentrate exiting the cross-flow filter can have a concentration in solid particles (end-concentration) of from 5 to 35 vol %, especially from 10 to 20 vol %. When a conventional (tubular) cross-flow filter is used, the end-concentration may for example be from 10 to 20 vol %. When a dynamic cross-flow filter is used, the end concentration may be for instance up to 50 vol %, for instance up to 65 vol %. If the filtered liquid is a pure reaction product, it can be collected as the finished product. If the filtered liquid is only in part a reaction product, further known separation steps, such as adsorption or distillation, may be necessary to isolate the reaction product from the rest of the liquid. In a preferred embodiment of the process of the present invention, at least part of the concentrate is returned to the vessel. This is especially preferred if at least part of the solid particles are catalyst particles which are still active in a process which is carried out in the vessel. The circulation of the concentrate may contribute to keeping the particles present inside the vessel in suspension in the slurry.

In a further embodiment of the present invention, at least part of the multiphase mixture contained in the vessel is at least partially degassed before being circulated through the at least one cross-flow filter. Indeed, as the real driving force available depends on the ratio of the gas holdup in the multiphase mixture comprised inside the vessel compared to the gas holdup in the multiphase mixture feeding the cross-flow filter, it is advantageous to decrease the gas holdup in the multiphase mixture feeding the cross-flow filter which will result in an increase of the real driving force available and favor the circulation of the multiphase mixture outside the vessel and inside the cross-flow filter.

Said degassing may occur naturally in the upper part of the vessel, without any specific additional means. Internal and/or external degassing aids may also be used to limit the gas entrainment in the down-corner current and especially into the flow sent through the cross-flow filter. Such internal and/or external degassing aids are usually required if the bubble size distribution of the gas present in the multiphase mixture contained in the vessel is such that no sufficient natural degassing occurs inside the vessel. Any external or internal degassing aids or apparatus or designs known in the art may be used. An example of internal aid is the use of baffles. An example of external aid is an expansion of the pipe diameter or an external chamber, in which the superficial velocity of the multiphase mixture is reduced therefore allowing at least part of the gas to disengage and return to the vessel through a separate pipe.

Figure 2:
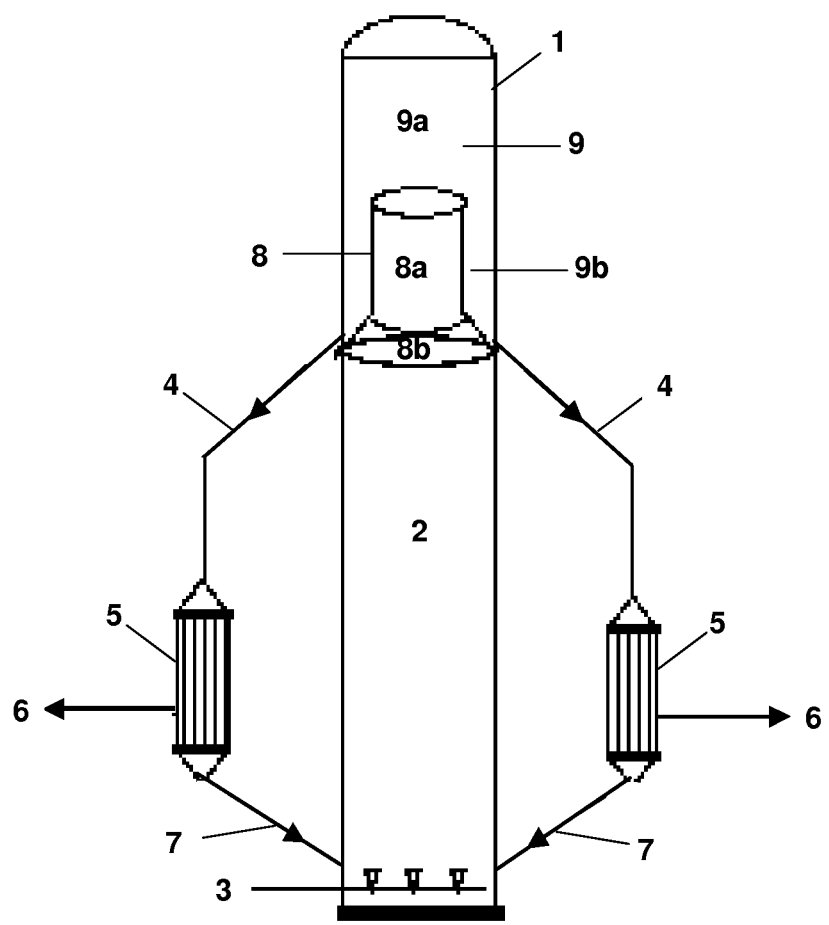
FIGS. 2 and 3 illustrate examples of internal and external degassing aids.

In a preferred embodiment, the multiphase mixture contained in the vessel is at least partially degassed, preferably substantially completely degassed, before being circulated through the external circuit including the cross-flow filter, using an internal aid, especially an internal reactor assembly such as the one illustrated in FIG. 2, i.e. comprising a conical part (8a) topped by a cylindrical part (8b), which provides for a substantially total separation between the liquid and gas phases. According to this preferred embodiment, the multiphase mixture comprised in the vessel (liquid+gas+solid) flows upwards inside the vessel and, when it achieves the conical part (8a) of the circular baffle (8), the restriction in the diameter promotes an increase of the kinetic energy and of the fluid axial momentum. After the rise of said momentum, the cylindrical part (8b) of the circular baffle (8) acts to promote a fluid jet, and a core with higher axial velocity is created in the inner region (9a) of the degassing place (9), i.e. in the upper part of the vessel, above the cylindrical part of the circular baffle (8a). In the outer region (9b) of the degassing place, i.e. in the upper part of the vessel, on the side of the cylindrical part of the circular baffle (8*a*), a downward flow of degassed mixture flows to the reactor outlet nozzles and to pipes and connections (4) to be fed to the at least one cross-flow filter (5). To avoid catalyst deposits on the cylindrical part (8*a*) of the degassing aid, some openings may be done in the cylindrical part (8*a*) of the degassing aid, especially in the lowest part of said degassing aid, usually close to the junction between the degassing aid and the vessel, so that part of the catalyst flows down, back in the vessel. In another embodiment, a baffle may be installed beneath the openings to avoid short-circuit of gas bubbles going from the multiphase mixture (which is inside the vessel reactor, i.e. riser current) directly to the reactor outlet nozzles and to pipes and connections (4).

According to another aspect of the present invention, there is provided a device for separating liquid from a multiphase mixture comprising solid particles and at least one liquid phase forming together at least one suspension, and a gas phase, said device comprising:

- a vessel, containing the multiphase mixture, equipped with a gas inlet in the bottom of the vessel and an optional gas outlet at the top of the vessel, the gas phase flowing upwards through the suspension such that a gas-lift effect occurs inside the vessel,
- optionally a degassing aid located inside or outside the vessel,
- at least one cross-flow filter located outside the vessel,
- feeding and discharge pipes and connections connecting the vessel to the cross flow filter, said pipes and connections being designed such that at least part of the mixture, optionally at least partially degassed, circulates through the cross-flow filter using the natural recirculation provide by the gas-lift effect occurring inside the vessel.

In an especially preferred embodiment of the present invention, the pipes and connections connecting the vessel to the cross-flow filter (feeding and discharge pipes) are designed such that at least part of the mixture, optionally at least partially degassed, circulates through the cross-flow filter using only the natural recirculation provided by the gas-lift effect occurring inside the vessel. Especially, the device of the invention does not comprise any means between the mixture outlet of the vessel and the inlet of the cross-flow filter, in particular the device of the invention does not comprise a pump upstream the cross-flow filter.

According to the present invention, the geometry and the operating conditions of the vessel are usually designed such that the gas holdup in the vessel is of at least 5%, preferably at least 10%, more preferably at least 15%. The gas holdup in the vessel can be as high as possible, but generally the geometry and the operating conditions of the vessel are designed such that the gas holdup in the vessel is of at most 70%, in particular at most 50% and very particularly at most 30%. The geometry of the vessel includes mainly its height and its diameter. The operating conditions include mainly the gas velocity at the bottom and at the top of the vessel, the gas density, the pressure inside the vessel, and the physical properties of the liquid such as its surface tension, viscosity and density. The gas holdup in the vessel will define the total driving force available, which will in turn cause the circulation of the multiphase mixture through the at least one cross-flow filter.

Especially, the pipes and connections in the present invention are designed such that, in combination with the cross-flow filter, which corresponds to the external circuit, the total driving force available results in a flow through the system such that the associated pressure drops match the said driving force. Thus, such flow results in a tangential velocity of the multiphase mixture, continuously impoverished in liquid, along the cross-flow filter filtration medium, in the range from 0.5 to 6 m/s. In the present invention, the trans-medium velocity of the filtered liquid through the filter medium is preferably kept to a value equal to or below 15 m/h, preferably equal to or below 10 m/h, for instance equal to or below 8 m/h and usually equal to or higher than 0.5 m/h, in particular equal to or higher than 1 m/h, especially equal to or higher than 5 m/h. The trans-medium velocity of the filtered liquid through the filter medium may typically be from 1 to 15 m/h, preferably from 5 to 10 m/h.

Advantageously, the pipes and connections of the present invention are designed such that, in combination with the vessel design and operating conditions and with the cross-flow filter design, in any given point of the filter medium of any given tube, the tangential velocity of multiphase mixture, continuously impoverished in filtered liquid, along the filter medium is of from 400 to 2000 times, preferably from 700 to 1500 times or from 700 to 1000 times, for example around 1000 times the trans-medium velocity of the filtered liquid through the filter medium.

For a given vessel, the real driving force available depends on the ratio of the gas holdup in the multiphase mixture comprised inside the reactor compared to the gas holdup in the multiphase mixture feeding the cross-flow filter. Thus internal and/or external mechanical degassing aids, such as those described above, can improve the process of the present invention because it will decrease the gas holdup in the multiphase mixture feeding the cross-flow filter and thus increase the real driving force available.

In a preferred embodiment of the present invention, the cross-flow filter is connected to the vessel via at least one pipe and/or connection corresponding to the outlet of the vessel, feeding the cross-flow filter, and being located in the upper part of the vessel but still under the upper part of the multiphase mixture. In an especially preferred embodiment, the cross-flow filter is connected to the vessel via at least two pipes and/or connections, one corresponding to the outlet of the vessel, feeding the cross-flow filter, and being located in the upper part of the vessel but still under the upper part of the multiphase mixture, and the other one corresponding to the inlet of the vessel, fed by the concentrate from the outlet of the cross-flow filter, and being located in the lower part of the vessel. Usually, said outlet and inlet are separated by a height corresponding to at least 50% of the height of the multiphase mixture present inside the vessel, preferably of at least 70%, more preferably of at least 80%.

In still another preferred embodiment, the cross-flow filter is equipped with a back-pulse system. A back-pulse is an instantaneous change in the direction of the flux of the filtered liquid through the filter medium (reverse flux), which allows removal of the particles accumulating on the filter medium. Advantageously, the back-pulse system is an online cleaning device designed to improve the pulse behavior and achieve less pulse fluid consumption, as well as to achieve high efficiencies in the cleaning of the filter media. For instance, the back-pulse system may be designed such that part of the filtered liquid removed from the cross-flow filter is separated from the main filtered-liquid stream and is used as back-pulse liquid. The amount of the filtered liquid separated from the main filtered-liquid stream will depend on the back-flush system design, on the back-pulse frequency, and especially on the cross-flow filter design, but it is typically from 0.5 to 10 vol %, especially from 1 to 5 vol %, for instance about 2.5 vol %. The back-pulse frequency and the total pulse time will depend on the back-flush system design and especially on the cross-flow filter design, but the back-pulse frequency is usually from 0.1 to 10 pulses per minute, preferably from 0.5 to 5 pulses per minute, advantageously about 1 pulse per minute, a total pulse time of about 1 second being commonly used. The back-pulse pressure is typically 1.5 to 10 times higher than the filtration force of the filtered liquid through the filter medium, preferably from 2 to 5 times the filtration force.

Figure 3:
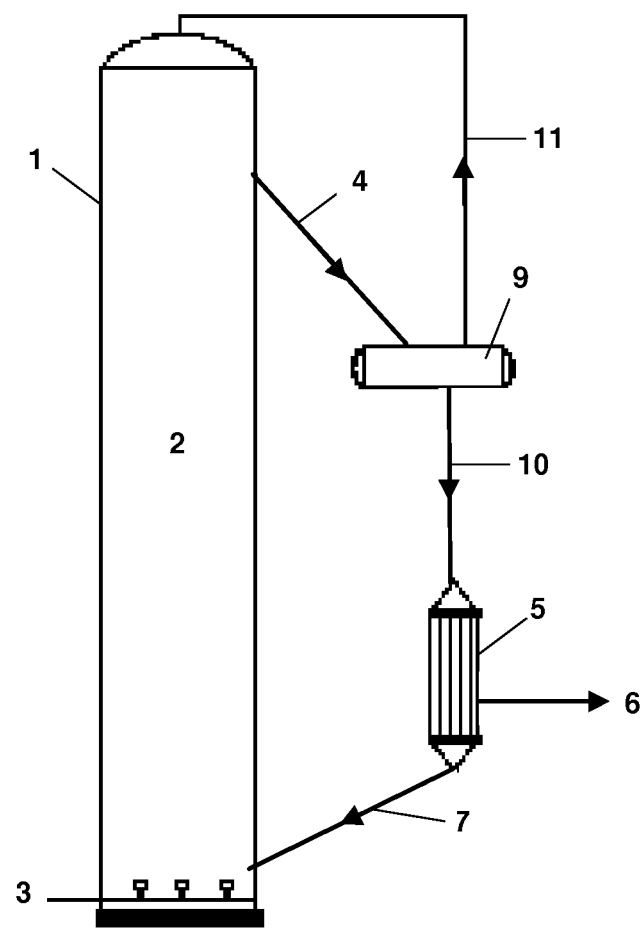

An embodiment of the process and device of the present invention, based on the use of two cross-flow filters arranged in parallel, is illustrated in FIG. 1. Examples of internal and external degassing aids are illustrated in FIGS. 2 and 3. A scheme of a cross-flow filter working in the "inside-out" way, suitable in the process or in the device of the present invention, is shown in FIG. 4. An example of back-pulse system design is illustrated in FIG. 5.

FIG. 1 is a general flow sheet showing a vessel (1) which contains a multiphase mixture (2) comprising solid particles and at least one liquid phase forming together at least one suspension, and gas phase, the gas phase being fed by a gas inlet (3) situated at the bottom of the vessel (1), wherein the multiphase mixture flows through pipes and connections (4) and circulates downwards through the cross-flow filters (5) containing tubes arranged vertically. In the cross-flow filters (5), the multiphase mixture (2) is separated into a filtered liquid (6) which is collected from the cross-flow filters (5) and into a concentrate (7) which is recycled to the vessel (1) through pipes and connections (7).

FIG. 2 describes a device similar to the device of FIG. 1 but comprising an internal degassing aid in the form of a circular baffle (8), comprising a conical part (8a) topped by a cylindrical part (8b). According to this specific embodiment, the multiphase mixture (2) flows upwards inside the vessel and, when it achieves the conical part (8a) of the circular baffle (8), the restriction in the diameter promotes an increase of the kinetic energy and of the fluid axial momentum. After the rise of said momentum, the cylindrical part (8b) of the circular baffle (8) acts to promote a fluid jet, and a core with higher axial velocity is created in the inner region (9a) of the degassing place (9), i.e. in the upper part of the vessel, above the cylindrical part of the circular baffle (8a). The at least partially degassed multiphase mixture flows down the external part of the baffle (8), in the outer region (9b) of the degassing place. As in FIG. 1, this at least partially degassed multiphase mixture flows through pipes and connections (4), circulates downwards through the cross-flow filters (5), and is separated into a filtered liquid (6) which is collected from the cross-flow filters (5) and into a concentrate (7) which is recycled to the vessel (1) through pipes and connections (7).

FIG. 3 shows a device similar to the device of FIG. 1 but comprising only one cross-flow filter (5) and comprising an external degassing aid (9). According to this other specific embodiment, the multiphase mixture (2) flows through pipe and connections (4) into an external degassing aid (9) corresponding to an external chamber in which at least part of the gas contained in the multiphase mixture (2) is separated and recycled to the vessel (1) through pipe and connections (11). The at least partially degassed multiphase mixture flows through pipe and connections (10), circulates downwards through the cross-flow filter (5), and is separated into a filtered liquid (6) which is collected from the cross-flow filter (5) and into a concentrate (7) which is recycled to the vessel (1) through pipe and connections (7).

Figure 4A:
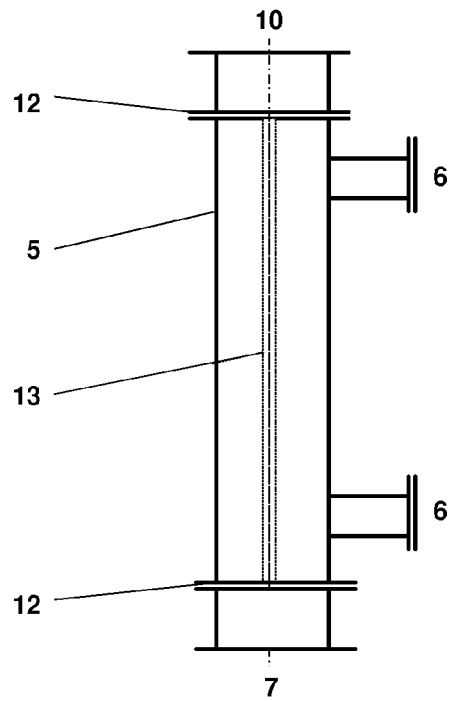
FIG. 4a illustrates a scheme of a single tube cross-flow filter, working in the "inside-out" way, suitable in the process or in the device of the present invention.
Figure 4B:
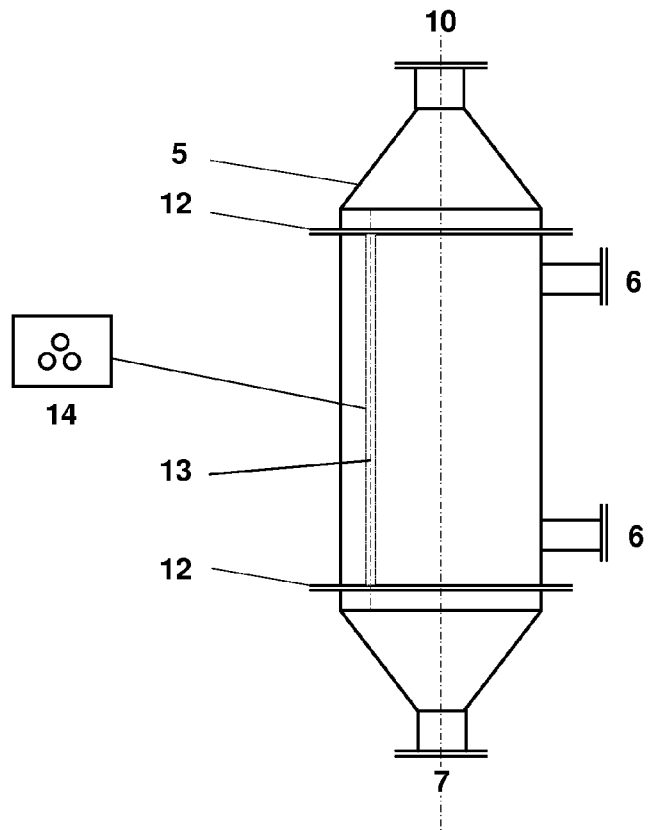
FIG. 4b illustrates a scheme of a multi-tubes cross-flow filter, working in the "inside-out" way, suitable in the process or in the device of the present invention.
Figure 4C:
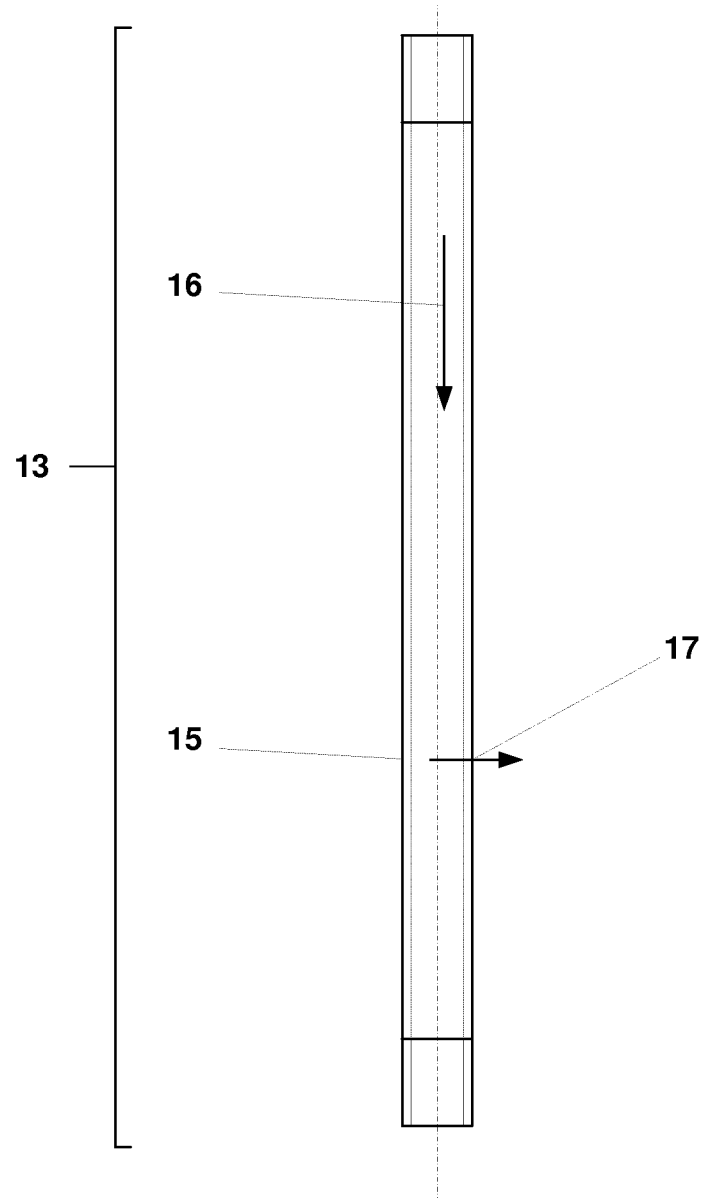
FIG. 4c shows a filter tube detail.
Figure 5:
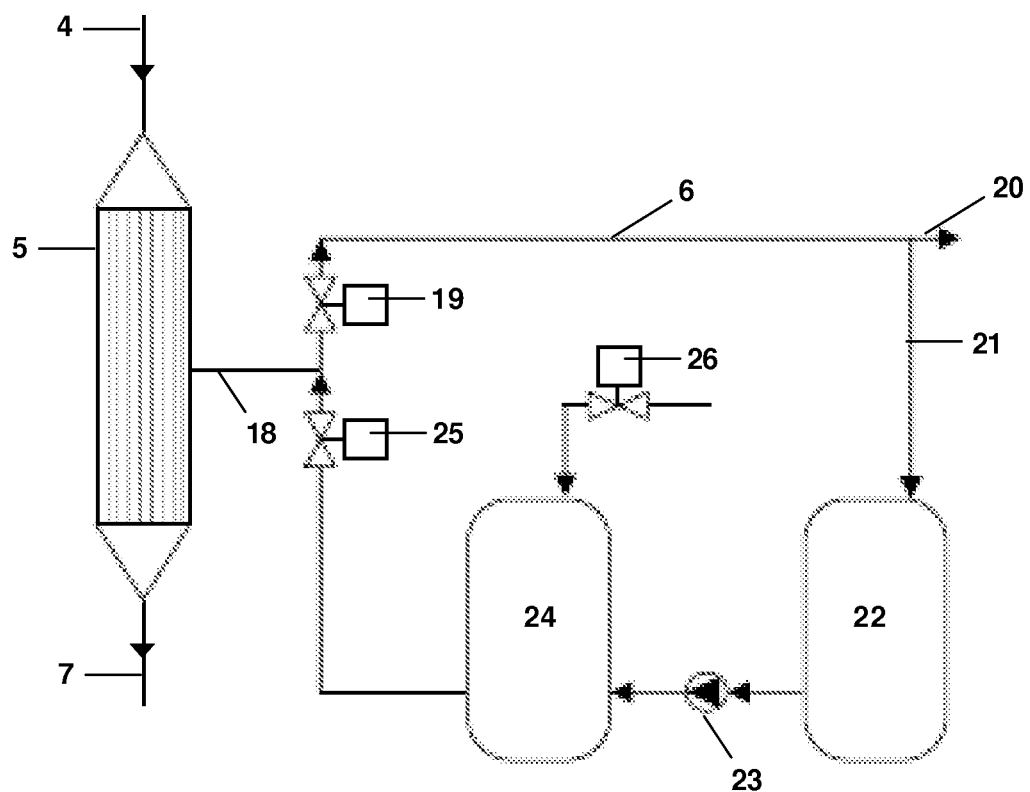
FIG. 5 shows an example of a back-pulse system design.

FIGS. 4a and 4b are schemes of cross-flow filters working in the "inside-out" way, suitable in the process or in the device of the present invention. Two types are shown: single tube (FIG. 4a) and multi-tubes (FIG. 4b) cross-flow filters. FIG. 4c shows a filter tube detail. In both FIGS. 4a and 4b, the cross-flow filter (5) comprises one or several filter tubes (13) within a filter tube sheet (12). If more than one tube is present, they can be arranged in various pitches (i.e. tube layouts or patterns), for example in triangular pitch (14). The multiphase mixture flows downwards, via pipe and connections (10), through the cross-flow filter (5) and especially inside the filter tubes (13). The multiphase mixture flowing into the filter tubes (13) is progressively impoverished in liquid, leading to a concentrate, as the filtered liquid flows through the filter medium (15). The multiphase mixture continuously impoverished in liquid (or the concentrate) flows inside the filter tubes (13), along the filter medium (15), with a tangential velocity illustrated as the arrow (16). The concentrate is collected from the inside of the filter tubes, at the bottom of the cross flow filter (5), through pipe and connections (7). The filtered liquid flows through the filter medium (15) with a trans-medium velocity illustrated as the arrow (17) and is collected in the shell part of the cross-flow filter (5) and exits from nozzles on the shell side (6).

FIG. 5 is an example of back-pulse system design wherein the filtered liquid (6) exits the cross-flow filter through pipe (18) and through valve (19). The filtered liquid (6) is separated into a main stream (20) and into a flow (21), fed to a buffer tank (22) which acts as feed tank for the back-pulse system (back-flush fluid). Pump (23) pumps the back-flush fluid from the buffer tank (22) into the back-pulse vessel (24). Back-pulse vessel (24) is pressurized with an inert gas such as nitrogen and is thus typically filled about 50% with back-flush fluid, the top part of the vessel comprising the inert gas. When the back-pulse valve (25) opens, there is a rapid expansion of the gas inside the back-pulse vessel (24), which promotes a large instantaneous liquid flow from the vessel (24) to the cross-flow filter (5), through pipe (18). To promote an effective back-pulse, the valve (19) needs to be closed before the back-pulse valve (25) opens, in order to force all the back-flush into the cross-filter. Preferably, the valves are quick action valves to maximize the filter operation and minimize the consumption of back-flush fluid. According to FIG. 5, the back-pulse sequence is as follows: (a) close valve (19), (b) open back-pulse valve (25), (c) close back-pulse valve (25), and (d) open valve (19).

The present invention also relates to the use of the process and of the device of the present invention for the separation of liquid from a multiphase mixture comprising solid particles and at least one liquid phase forming together at least one suspension, and a gas phase.

In a preferred embodiment of the present invention, the above described process and device are used in the anthraquinone (or AO) loop process for the manufacture of hydrogen peroxide.

The expression "alkylanthraquinone process" is intended to denote a process for producing an aqueous hydrogen peroxide solution which consists in subjecting a working solution of at least one alkylanthraquinone and/or of at least one tetrahydroalkylanthraquinone to a hydrogenation step, in a diluent, to produce one or more alkylanthrahydroquinones and/or alkyltetrahydroanthraquinones. The working solution leaving the hydrogenation step is then subjected to an oxidation with oxygen, air or oxygen-enriched air to give hydrogen peroxide and to reform the alkylanthraquinones and/or alkyltetrahydroanthraquinones. The hydrogen peroxide formed is then separated from the working solution by means of an extraction step, for example using water, the hydrogen peroxide being recovered in the form of a crude aqueous hydrogen peroxide solution. The working solution leaving the extraction step is then recycled into the hydrogenation step in order to recommence the hydrogen peroxide production cycle.

The term "alkylanthraquinones" is intended to denote, for example, 9,10-anthraquinones substituted in position 1, 2 or 3 with at least one alkyl side chain of linear or branched aliphatic type comprising at least one carbon atom. These alkyl chains usually comprise less than 9 carbon atoms and preferably less than 6 carbon atoms. Examples of such alkylanthraquinones are 2-ethylanthraquinone, 2-isopropylanthraquinone, 2-sec- and 2-tert-butylanthraquinone, 1,3-, 2,3-, 1,4- and 2,7-dimethylanthraquinone, and 2-iso- and 2-tert-amylanthraquinone, and mixtures of theses quinones.

The term "alkyanthrahydroquinones" is intended to denote the 9,10-hydroquinones corresponding to the 9,10-alkyanthraquinones specified above.

Thus, the present invention also relates to the use of the process or device of the present invention in the hydrogenation step of an alkylanthraquinone process for the manufacture of hydrogen peroxide, wherein the vessel is the hydrogenation reactor, the solid particles are a hydrogenation catalyst, the gas phase contains hydrogen and the liquid phase is the hydrogenated working solution.

According to a further aspect of the present invention, there is provided a process for the preparation of hydrogen peroxide, which process comprises the following steps:

a) in a hydrogenation reactor vessel, contacting hydrogen gas as gas phase with a working solution comprising at least one organic solvent and at least one anthraquinone compound in the presence of solid catalyst particles, leading to an hydrogenated working solution as a liquid phase, the gas phase flowing upwards through the liquid phase such that a gas-lift effect occurs inside the vessel and the solid particles being in suspension inside the liquid phase, b) separating the liquid containing the hydrogenated working solution from the multiphase mixture by the process of the present invention or by using the device of the present invention, and recycling the concentrate to the hydrogenation reactor vessel, c) oxidizing the recovered hydrogenated working solution from step b) to form hydrogen peroxide, d) extracting the hydrogen peroxide with an aqueous medium, and e) optionally adding a stabilizer to the extracted aqueous hydrogen peroxide solution.

A survey of the well-known anthraquinone process and its numerous modifications is given in the "Ullmann's Encyclopedia of Industrial Chemistry", Fifth Edition, 1989, Volume 3, pages 447-457. For each of the distinct process steps, the Ullmann reference discloses numerous different possibilities.

In the present invention, the hydrogenation step a) is usually conducted at a temperature from 45 to 80° C. and at a pressure of from 0.2 to 5 bar. In said step a), hydrogen is typically fed into the vessel at a rate of from 650 to 750 normal $m^3$ per ton of hydrogen peroxide to be produced.

In view of the above, the present invention also relates to the use of the process and of the device of the present invention in the alkylanthraquinone(s) process for the manufacture of hydrogen peroxide.

The present invention is further illustrated below without limiting the scope thereto.

EXAMPLE

The present example was based on a device as described in FIG. 3.

In the present example, the vessel (1) was a hydrogenation reactor and the multiphase mixture (2) comprised a hydrogenation catalyst in the form of particles as solid phase, hydrogen as gas phase, and a hydrogenated working solution comprising a solvent and an anthraquinone compound as liquid phase. The concentration of the solid particles in the multiphase mixture (2) was of 46 kg/$m^3$. The gas phase (hydrogen gas) was fed by a gas inlet (3) situated at the bottom of the vessel (1). The flow of the gas and the pressure inside the vessel (1) were such that the average gas hold-up in the multiphase mixture (2) was of 15.5%. The apparent density of the multiphase mixture (2) at 65° C. was of 969 kg/$m^3$. The height of the vessel (1) was 35 m.

The natural recirculation provided by the gas-lift effect occurring inside the vessel entrained a part of the multiphase mixture (2) outside the vessel (1), through pipe and connections (4) into an external degassing aid (9). At the outlet of the external degassing aid (9), the average gas hold-up in the multiphase mixture was of 5%. The gas which had been separated from the multiphase mixture (2) was recycled to the vessel (1) trough pipe and connections (11).

The partially degassed multiphase mixture circulated through the cross-flow filter (5) via pipe and connections (10). The cross-flow filter (5) was operated according to the "inside-out" mode, namely, the multiphase mixture flew inside the filter tubes. The cross-flow filter (5) contained 60 filter tubes arranged vertically and having a pitch arrangement (i.e. tube layout or pattern) which was triangular. The filter tube pitch (i.e. center-center distance of adjoining tubes) was of 52.5 mm. The filter tubes had an inside diameter of 25 mm and a filtration medium length of 2152 mm.

Further to the natural circulation of the multiphase mixture, the partially degassed multiphase mixture entered into the cross-flow filter (5) with a tangential velocity along the filter tubes (at the inlet of the cross-flow filter) of 2.5 m/s. The trans-medium velocity of the filtered liquid at the inlet of the cross-flow filter was of 8.4 m/h. The total pressure drop of the stream flowing through the cross-flow filter was of 50 mbar. The pressure drop through the filter medium of the cross-flow filter was 200 mbar.

The concentrate of the multiphase mixture was collected from the inside of the tubes, at the bottom of the cross-flow filter (5). Said concentrate was recycled to the hydrogenation vessel (1) via pipe and connections (7). The filtered hydrogenated working solution was collected as flow (6) from nozzles on the shell side of the cross-flow filter (5).

Should the disclosure of any patents, patent applications, and publications which are incorporated herein by reference conflict with the description of the present application to the extent that it might render a term unclear, the present description shall take precedence.

The invention claimed is:

1. A process for separating liquid from a multiphase mixture contained in a vessel and comprising solid particles and at least one liquid phase forming together at least one suspension, and a gas phase flowing upwards through the suspension such that a gas-lift effect occurs inside the vessel, in which at least part of the multiphase mixture, optionally at least partially degassed, is circulated through at least one cross-flow filter located outside the vessel, therefore separating said part of the multiphase mixture into a filtered liquid and a concentrate, wherein said part of the multiphase mixture circulates through the cross-flow filter using the natural recirculation provided by the gas-lift effect occurring inside the vessel, and wherein the tangential velocity of said multiphase mixture, continuously impoverished in filtered liquid, along a filter medium is of from 400 to 2000 times the trans-medium velocity of the filtered liquid through the filter medium.

2. The process according to claim 1, wherein the cross-flow filter comprises at least one tube, and wherein at least a part of the wall of said tube is made of the filter medium.

3. The process according to claim 1, wherein the liquid phase in said multiphase mixture has a gas holdup in the vessel of at least 5%.

4. The process according to claim 1, wherein the pressure drop across the filter medium is from 0.05 to 10 bar.

5. The process according to claim 1, wherein the trans-medium velocity of the filtered liquid through the filter medium is from 1 to 15 m/h.

6. The process according to claim 2, wherein the multiphase mixture to be filtered flows through the cross-flow filter outside the at least one tube, wherein the filtered liquid is collected inside the tube, and wherein the at least one tube is located horizontally or vertically.

7. The process according to claim 2, wherein the multiphase mixture to be filtered flows through the cross-flow filter inside the at least one tube, wherein the filtered liquid is collected outside the at least one tube, wherein the at least one tube contained in the cross-flow filter is located vertically, and wherein the multiphase mixture to be filtered flows downwards.

8. The process according to claim 2, wherein, in any given point of the filter medium of any given tube, the tangential velocity of the concentrate along the filter medium is from 700 to 1000 times, the trans-medium velocity of the filtered liquid through the filter medium.

9. The process according to claim 1, wherein the cross-flow filter is a dynamic cross-flow filter.

10. The process according to claim 1, wherein the concentrate is recycled into the vessel.

11. The process according to claim 1, wherein, upstream of the cross-flow filter, the multiphase mixture to be filtered is at least partially degassed.

12. A method for the manufacture of hydrogen peroxide, comprising using the process of claim 1 in a hydrogenation step of an alkylanthraquinone process, wherein the vessel is a hydrogenation reactor, the solid particles are a hydrogenation catalyst, the gas phase contains hydrogen, and the liquid phase is a hydrogenated working solution.

13. A process for the preparation of hydrogen peroxide comprising the following steps:
  a) in a hydrogenation reactor vessel, contacting hydrogen gas as gas phase with a working solution comprising at least one organic solvent and at least one anthraquinone compound in the presence of solid catalyst particles, leading to an hydrogenated working solution as a liquid phase, the gas phase flowing upwards through the liquid phase such that a gas-lift effect occurs inside the vessel and the solid particles being in suspension inside the liquid phase,
  b) separating the liquid containing the hydrogenated working solution from the multiphase mixture by the process according to claim 1, and recycling the concentrate to the hydrogenation reactor vessel,
  c) oxidizing the recovered hydrogenated working solution from step b) to form hydrogen peroxide,
  d) extracting the hydrogen peroxide with an aqueous medium, and
  e) optionally adding a stabilizer to the extracted aqueous hydrogen peroxide solution.

14. The process according to claim 2, wherein, in any given point of the filter medium of any given tube, the tangential velocity of the concentrate along the filter medium is from 700 to 1500 times, the trans-medium velocity of the filtered liquid through the filter medium.

15. The process according to claim 1, wherein the trans-medium velocity of the filtered liquid through the filter medium is from 5 to 10 m/h.

16. The process according to claim 1, wherein the tangential velocity of said multiphase mixture along said filter medium is from 0.5 to 6 m/s.

\* \* \* \* \*